(12) United States Patent
Ashby et al.

(10) Patent No.: US 10,401,525 B2
(45) Date of Patent: Sep. 3, 2019

(54) WIRELESS POWER QUALITY ALERT FOR DELAYED CHARGING WITH ELECTRIC VEHICLES

(71) Applicant: GM Global Technology Operations LLC, Detroit, MI (US)

(72) Inventors: Ryan M. Ashby, Novi, MI (US); Brandon R. Jones, White Lake, MI (US); Andrew J. Namou, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 15/453,165

(22) Filed: Mar. 8, 2017

(65) Prior Publication Data

US 2018/0257500 A1 Sep. 13, 2018

(51) Int. Cl.
| | |
|---|---|
| *H02J 7/00* | (2006.01) |
| *H02J 7/14* | (2006.01) |
| *G01V 3/10* | (2006.01) |
| *B60Q 5/00* | (2006.01) |
| *B60Q 1/50* | (2006.01) |
| *B60L 53/12* | (2019.01) |
| *B60L 53/31* | (2019.01) |

(52) U.S. Cl.
CPC .............. *G01V 3/10* (2013.01); *B60L 53/12* (2019.02); *B60L 53/31* (2019.02); *B60Q 1/50* (2013.01); *B60Q 5/005* (2013.01); *Y02T 10/7005* (2013.01); *Y02T 90/16* (2013.01)

(58) Field of Classification Search
USPC ....... 320/108, 107, 109, 137, 104, 132, 155, 320/165, 166
See application file for complete search history.

(56) References Cited

U.S. PATENT DOCUMENTS

| | | | |
|---|---|---|---|
| 8,169,186 B1* | 5/2012 | Haddad ............... | B60L 11/1835 180/14.3 |
| 2008/0275600 A1* | 11/2008 | Rask ........................ | B60K 6/24 701/22 |
| 2008/0290842 A1* | 11/2008 | Davis ....................... | B60L 7/24 320/166 |
| 2010/0315038 A1* | 12/2010 | Terao ...................... | H01F 38/14 320/108 |
| 2011/0022256 A1* | 1/2011 | Asada .................. | B60L 11/1824 701/22 |
| 2012/0041804 A1* | 2/2012 | Sahinoglu ........... | B60L 11/1816 705/14.1 |
| 2013/0179061 A1* | 7/2013 | Gadh .................. | B60L 11/1842 701/123 |
| 2014/0312833 A1* | 10/2014 | Won ..................... | H04B 5/0037 320/108 |

(Continued)

*Primary Examiner* — Alexis B Pacheco
(74) *Attorney, Agent, or Firm* — Harness, Dickey & Pierce, P.L.C.

(57) ABSTRACT

A delayed charging system for a vehicle implements an energy transfer efficiency check prior to the scheduled charge time to confirm sufficient grid power quality and wireless power quality. In addition to this, a foreign object check is performed prior to the scheduled charge. These checks are performed immediately after the customer sets up the delayed session as well as at specified intervals after that. If a power quality issue is detected, the customer will be alerted so they can remedy the situation.

12 Claims, 2 Drawing Sheets

(56) References Cited

U.S. PATENT DOCUMENTS

| | | | | |
|---|---|---|---|---|
| 2015/0278038 A1* | 10/2015 | Halker | ............... | G06F 11/20 |
| | | | | 714/3 |
| 2015/0303714 A1* | 10/2015 | Keeling | ............ | B60L 11/1809 |
| | | | | 320/108 |
| 2015/0364945 A1* | 12/2015 | Miller | ............... | H02J 7/025 |
| | | | | 320/108 |
| 2015/0367740 A1* | 12/2015 | McGrath | ............ | B60L 11/1837 |
| | | | | 320/137 |
| 2017/0155351 A1* | 6/2017 | Oguma | ............... | B60L 11/08 |
| 2018/0043787 A1* | 2/2018 | Shah | ............... | B60L 11/1827 |

* cited by examiner

WIRELESS POWER QUALITY ALERT FOR DELAYED CHARGING WITH ELECTRIC VEHICLES

FIELD

The present disclosure relates to delayed charging for electric vehicles and more particularly to a wireless power quality check prior to the scheduled charge time to notify a vehicle owner of charging problems.

BACKGROUND AND SUMMARY

This section provides background information related to the present disclosure which is not necessarily prior art.

When utilizing delayed charging, customers can save money by charging at off peak hours when electric rates are cheaper. When attempting to perform a delayed charge with a wireless system, issues may arise which will make the delayed charge session unsuccessful. These issues include misalignment, foreign object intrusion and faulty grid power.

The present disclosure implements an energy transfer efficiency check prior to the scheduled charge time to confirm sufficient grid power quality and wireless power quality. In addition to this, a foreign object check is performed prior to the scheduled charge. These checks are performed immediately after the customer sets up the delayed session as well as at specified intervals after that. If a power quality issue is detected, the customer will be alerted so they can remedy the situation before they leave the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
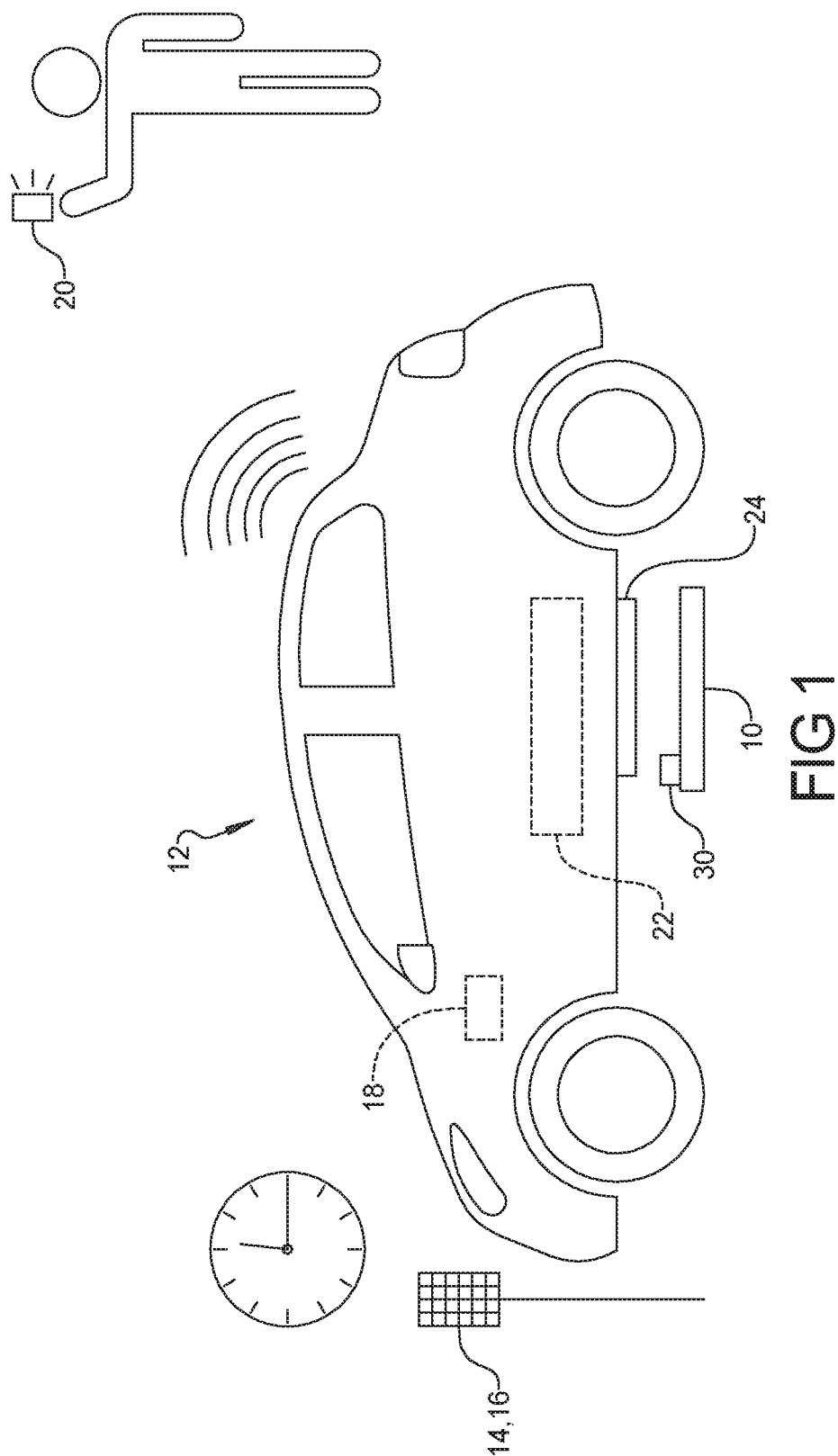
Figure 2:
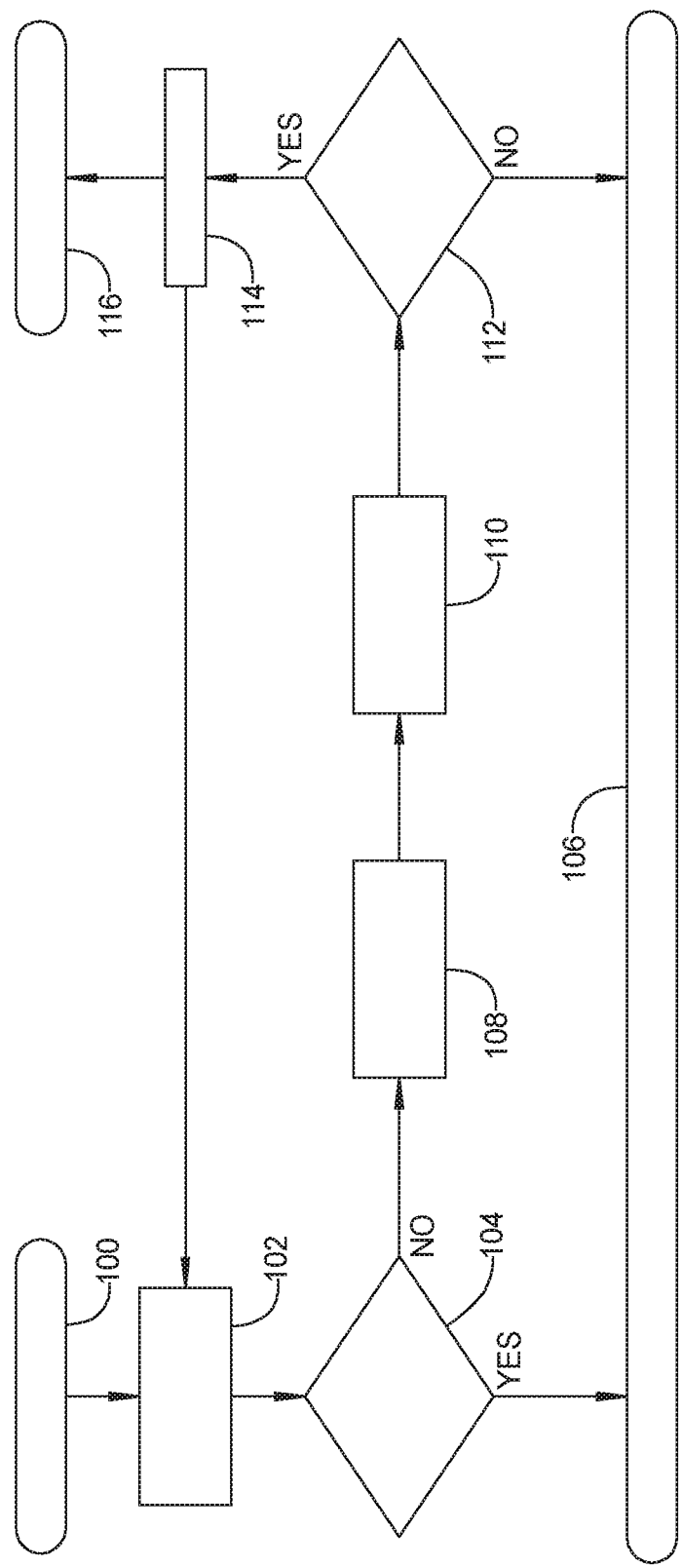

FIG. 1 is a schematic view of an electric vehicle charging system according to the principles of the present disclosure; and FIG. 2 is a flow diagram illustrating exemplary steps for providing a wireless quality alert for delayed charging with an electric vehicle according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1 a vehicle charging station is shown including a wireless vehicle charger 10 and a vehicle 12 that is parked over top of the wireless vehicle charger 10. A charger control panel 14 and charger control unit 16 can be provided for controlling operation of the wireless vehicle charger 10. The vehicle 12 includes a vehicle control unit 18. The vehicle control unit 18 and/or charger control unit 16 can be provided with a communication system that can provide communication between the vehicle control unit 18 and the charger control unit 16 as well as providing communication to the vehicle owner through text message, email or other known communication technique that can be accessed through the users smart phone, tablet, computer or other user communication device 20. The communication between the vehicle control unit 18, the charger control unit 16 and the user communication device 20 is preferably a wireless communication although other wired communications could be used, as desired.

Wireless vehicle chargers 10 are generally known and have the capability to charge the vehicle battery system 22 without a wired connection that makes electric vehicle ownership more convenient. The wireless-charging method takes advantage of electromagnetism by running electricity through a wire coil that creates a magnetic field that allows current to be transferred between two coils without physical connection. In the present instance, the two coils include the vehicle charger 10 on the ground and a receiver unit 24 on an underside of the vehicle 10. The receiver unit 24 is connected to the on-board battery system 22 for charging the battery system 22.

A vehicle owner can enable a delayed wireless charge through an interface with the vehicle control unit 18, charger control panel 14 and/or the user communication device 20. As shown in FIG. 2, after a delay is initiated at step 100, the control system performs a foreign object check at step 102. The foreign object check can utilize a sensor 30 or array of sensors that can be mounted on the vehicle charger 10 and/or the vehicle 12 for sensing an object and communicating the detection of an object to one of the charger control unit 16 and the vehicle control unit 18. The sensors can include sonar devices, stereo cameras, lasers and radar as appropriate for detecting an obstruction. At step 104 it is determined whether a foreign object was detected. If yes, the control proceeds to step 106 where the customer is alerted of a wireless power quality issue. The alert can be sent to the user's communication device 20 and/or optionally via activation of the vehicle lights, horn chirp or via indicators on the charger control panel 14.

If at step 104, no foreign object is detected, then the control proceeds to step 108 where a temporary wireless energy transfer is requested. At step 110 the energy transfer efficiency is evaluated. One possible means to calculate charging efficiency is by dividing the measured power [kW] by the requested power [kW] and multiplying by 100%.

At step 112, it is determined whether wireless energy transfer efficiency was within a predetermined acceptable level to determine if there is a problem with the charging system. If the wireless energy transfer efficiency is not within the predetermined acceptable level, the control proceeds to step 106 where the customer is alerted of a wireless power quality issue. The alert can be sent to the users communication device 20 and/or optionally via activation of the vehicle lights and horn or via the charger control panel 14. If at step 112, the wireless energy transfer efficiency is within the predetermined acceptable level, the control proceeds to step 114, where a predetermined period of time is allowed to pass before the control returns to step 102 for another periodic power quality check. Once the selected time for the delayed charge arrives, the control proceeds to step 116 to initiate the charging operation.

The system of the present disclosure improves the dependability of delayed charging using a wireless system so that customers can save money by charging at off peak hours when electric rates are cheaper and which will allow for a greater acceptance of the wireless charging technology.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of delayed wireless charging for a vehicle battery system, comprising:
    initiating a delayed charging event preceding any initial charging for a vehicle charger; and
    during a delay period preceding the delayed charging event, performing a foreign object detection to detect any foreign objects between the vehicle charger and a receiver unit on the vehicle, wherein the step of performing a foreign object detection is repeated multiple times at specified intervals during the delay period preceding a delayed charging event; and
    alerting a user of a wireless charging issue if a foreign object is detected.

2. The method according to claim 1, further comprising, during a delay period preceding the delayed charging event, performing a temporary wireless energy transfer and evaluating an energy transfer efficiency and alerting a user of a wireless charging issue if the energy transfer efficiency is not within a predetermined energy transfer efficiency level.

3. The method according to claim 1, wherein the step of alerting a user of a wireless charging issue is via a user's personal communication device.

4. The method according to claim 1, wherein the step of alerting a user of a wireless charging issue is via a vehicle horn chirp.

5. The method according to claim 2, wherein the step of alerting a user of a wireless charging issue is via a user's personal communication device.

6. The method according to claim 2, wherein the step of alerting a user of a wireless charging issue is via a vehicle horn chirp.

7. A method of delayed wireless charging for a vehicle battery system, comprising:
    initiating a delayed charging event preceding any initial charging for a vehicle charger; and
    during a delay period preceding the delayed charging event, performing a temporary wireless energy transfer and evaluating an energy transfer efficiency and alerting a user of a wireless charging issue if the energy transfer efficiency is not within a predetermined energy transfer efficiency level, wherein the step of performing a temporary wireless energy transfer and evaluating an energy transfer efficiency is repeated multiple times at specified intervals during the delay period preceding a delayed charging event.

8. The method according to claim 7, wherein the step of alerting a user of a wireless charging issue is via a user's personal communication device.

9. The method according to claim 7, wherein the step of alerting a user of a wireless charging issue is via a vehicle horn chirp.

10. A method of delayed wireless charging for a vehicle battery system, comprising:
   initiating a delayed charging event preceding any initial charging for a vehicle charger;
   during a delay period preceding the delayed charging event, performing a foreign object detection to detect any foreign objects between the vehicle charger and a receiver unit on the vehicle, wherein the step of performing a foreign object detection is repeated multiple times at specified intervals during the delay period preceding a delayed charging event; and
   alerting a user of a wireless charging issue if a foreign object is detected; and
   during the delay period preceding the delayed charging event, performing a temporary wireless energy transfer and evaluating an energy transfer efficiency and alerting a user of a wireless charging issue if the energy transfer efficiency is not within a predetermined energy transfer efficiency level, wherein the step of performing a temporary wireless energy transfer and evaluating an energy transfer efficiency is repeated multiple times at specified intervals during the delay period preceding a delayed charging event.

11. The method according to claim 10, wherein the step of alerting a user of a wireless charging issue is via a user's personal communication device.

12. The method according to claim 10, wherein the step of alerting a user of a wireless charging issue is via a vehicle horn chirp.

* * * * *